United States Patent
Arends et al.

(10) Patent No.: US 6,484,478 B1
(45) Date of Patent: Nov. 26, 2002

(54) SYSTEM AND METHOD FOR PACKAGING ORIENTED CONTAINERS

(75) Inventors: Craig W. Arends, Elgin, IL (US); Lonnie R. Seymour, Naperville, IL (US); Robert Lam, Glen Ellyn, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 09/490,212

(22) Filed: Jan. 24, 2000

(51) Int. Cl.⁷ .............................................. B65B 35/56
(52) U.S. Cl. ............................ 53/544; 53/534; 53/537; 198/379; 198/376
(58) Field of Search ..................... 53/48.4, 446, 498, 53/493, 495, 499, 147, 534, 537, 544; 198/374, 375, 376, 379, 382, 384, 394, 395, 398, 465.2, 735.1

(56) References Cited

U.S. PATENT DOCUMENTS

| | | | | |
|---|---|---|---|---|
| 2,528,912 A | * | 11/1950 | Rappaport | ................... 198/394 |
| 3,415,350 A | * | 12/1968 | Murphy | ....................... 198/394 |
| 3,451,523 A | * | 6/1969 | Evans et al. | ................. 198/394 |
| 3,541,751 A | * | 11/1970 | Quebe et al. | .................. 53/398 |
| 3,618,743 A | * | 11/1971 | Benatar | ....................... 198/395 |
| 3,635,322 A | | 1/1972 | Raudat et al. | |
| 3,811,243 A | | 5/1974 | Cunningham | |
| 3,816,968 A | * | 6/1974 | Morgan et al. | ............... 53/48.4 |
| 3,848,394 A | | 11/1974 | Heisler | |
| 3,934,714 A | | 1/1976 | Matsumoto | |
| 4,051,366 A | | 9/1977 | Gordon | |
| 4,143,754 A | * | 3/1979 | Eldred | ........................ 198/379 |
| 4,238,027 A | * | 12/1980 | Oelte | .......................... 198/504 |
| 4,344,522 A | | 8/1982 | Heisler | |
| 4,383,601 A | | 5/1983 | Heisler | |
| 4,428,474 A | * | 1/1984 | Gau et al. | ................... 198/394 |
| 4,596,330 A | | 6/1986 | Benno | |
| 4,640,406 A | | 2/1987 | Willison | |
| 5,058,724 A | | 10/1991 | Hinton | |
| 5,074,399 A | | 12/1991 | Kettle et al. | |
| 5,150,782 A | * | 9/1992 | Richter | ........................ 198/394 |
| 5,161,664 A | * | 11/1992 | LeBras | ....................... 198/419.3 |
| 5,215,180 A | * | 6/1993 | Allard et al. | ................ 198/395 |
| 5,224,586 A | * | 7/1993 | Naka et al. | .................. 198/394 |
| 5,919,028 A | * | 7/1999 | Enqvist | ........................ 198/394 |
| 6,267,221 B1 | * | 7/2001 | Bisi et al. | ................. 198/735.1 |

FOREIGN PATENT DOCUMENTS

| | | |
|---|---|---|
| FR | 1 545 680 | 11/1968 |
| FR | 2 652 059 | 3/1991 |
| GB | 2 077 684 A | 12/1981 |
| GB | 2 213 121 | 9/1989 |
| WO | WO96/1140 | 4/1996 |

OTHER PUBLICATIONS

"Shrinkwrap Can–Packs Oriented for Clubstores", Packing Digest, May 1996, pp. 24–26.
Hi–Cone Model 900 Can Orienter Sales Sheet, 1971, Illinois Tool Works Inc.
Bottle Oreinteation Label Verification Machine brochure, Owens Design Incorporated, 1996.
Pac Nova Clip Carrier, Sales Sheet.

\* cited by examiner

Primary Examiner—Stephen F. Gerrity
Assistant Examiner—Louis Huynh
(74) Attorney, Agent, or Firm—Pauley Petersen Kinne & Erickson

(57) ABSTRACT

A system and method for packaging oriented containers in a container carrier wherein a plurality of containers are fed into an orientation wheel including one or more chucks. Each chuck engages one end of the container and rotates the container into an oriented position. A transfer belt having a plurality of tactile fingers is operatively connected to the orientation wheel and transfers an oriented container nested within the tactile fingers in a fixed rotational position from the orientation wheel to a packaging machine. In a method of packaging containers according to this invention, multiple containers are positioned within the carrier in one or more rotational positions based upon the desired appearance of the package.

14 Claims, 11 Drawing Sheets

SYSTEM AND METHOD FOR PACKAGING ORIENTED CONTAINERS

BACKGROUND OF THE INVENTION

1. Field of the Invention

This invention relates to a system and method for packaging a plurality of containers in a carrier in an oriented manner.

2. Description of Related Art

Container carriers are often thermoplastic ring-type carriers, commonly called "six-pack" rings, that unitize a plurality of containers into a single package. Cardboard, paperboard and plastic shrink wrap are also commonly used to unitize a plurality of containers. The unitized containers are generally randomly oriented so that each container is positioned in a different rotational orientation within the carrier. This random orientation results in problems related to displaying the package, particularly the container's trademark and graphics. In addition, it is often preferable to ensure that UPC labels on the respective containers are oriented correctly, either facing inward or outward.

According to one method known in the art, individual containers are rotated, either manually or mechanically, into a preferred orientation after packaging randomly oriented containers in the container carrier. Rotation of the containers once the containers are engaged within the container carrier may destroy the integrity of the container carrier through excessive torque applied to the respective thermoplastic rings within the container carrier. Alternatively, rotation of the containers may be impossible once the containers are sealed within other packages known to those having ordinary skill in the art.

Therefore, a need exists for a system and method of orienting containers within a package without destroying the integrity of the carrier or slowing the packaging process.

SUMMARY OF THE INVENTION

This invention relates to a system and method for packaging oriented containers in a container carrier, such as in a thermoplastic ring carrier, a paperboard box-style carrier or a plastic shrink wrapped carrier. The system preferably cooperates with an inlet conveyor and a packaging machine. A plurality of containers are preferably fed into an inlet of an orientation wheel. The orientation wheel is positioned to rotate each container into a proper orientation and at the same time move each container from the inlet of system toward the packaging machine.

Preferably the orientation wheel comprises one or more recesses each including a chuck for engaging one end of each container and a pressure plate for contacting an opposite end of such container. Flush, and preferably mating, contact is formed between the chuck and the container so that the container is rotatable in synchronization with the chuck. A motor is preferably mechanically coupled to the chuck to effect rotation of the container.

At least one sensor is additionally connected with respect to the orientation wheel for locating the oriented position of the container and sending a signal to the motor to stop the rotation of the container. The sensor preferably operates in connection with an index mark positioned on each container or on or in a label for each container. In one preferred combination, the sensor comprises an ultra-violet photocell and the index mark comprises a visually undetectable mark, such as an ultra-violet index mark, positioned on the container.

When the sensor identifies a correct rotational position of the container, the motor preferably stops rotation of the container and fixes the orientation of the container within the orientation wheel.

The oriented containers are then engaged with a transfer belt connected with respect to the orientation wheel. The transfer belt transfers an oriented container in a fixed rotational position from the orientation wheel to the packaging machine. The transfer belt may include a plurality of fingers spaced to receive oriented containers from the orientation wheel. The plurality of fingers are preferably tactile so as to grip oriented containers and prevent any rotation out of an oriented position. In addition, the transfer belt must grip with sufficient force to prevent rotation as the container slides along a stationary floor or against a stationary wall.

The transfer belt then feeds oriented containers directly into the packaging machine. In one application for the system according to this invention, the packaging machine includes a plurality of jaws positioned to apply the container carrier over two or more oriented containers resulting in a package of properly oriented containers. Alternatively, the packaging machine may include other arrangements, such as paperboard loaders, known to those having ordinary skill in the art. The orientation of each respective container, may be adjusted relative to adjacent containers to match the configuration of the container carrier.

It is one object of this invention to provide a system and method for packaging a plurality of containers in a carrier in an oriented manner.

It is another object of this invention to provide a system and method for orienting a plurality of containers prior to packaging the containers in a carrier.

It is still another object of this invention to provide a system and method for packaging a plurality of containers wherein individual containers are rotated into orientation based upon an index mark on each respective container.

It is yet another object of this invention to provide a system and method for packaging a plurality of containers wherein individual oriented containers are transferred from an orientation station to a packaging machine in a fixed rotational position.

It is yet another object of this invention to provide a system and method for packaging a plurality of oriented containers wherein the oriented containers are individually and independently placed at a pickup location at a front end of a packaging machine.

It is yet another object of this invention to provide a system and method permitting orientation of adjacent containers in different rotational position relative to each other.

It is still another object of this invention to provide a package having a plurality of discreet containers with each container having at least three viewing panels wherein a carrier is positioned at one plane and the containers are oriented so that a different viewing panel for each container is visible on one side of the package.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
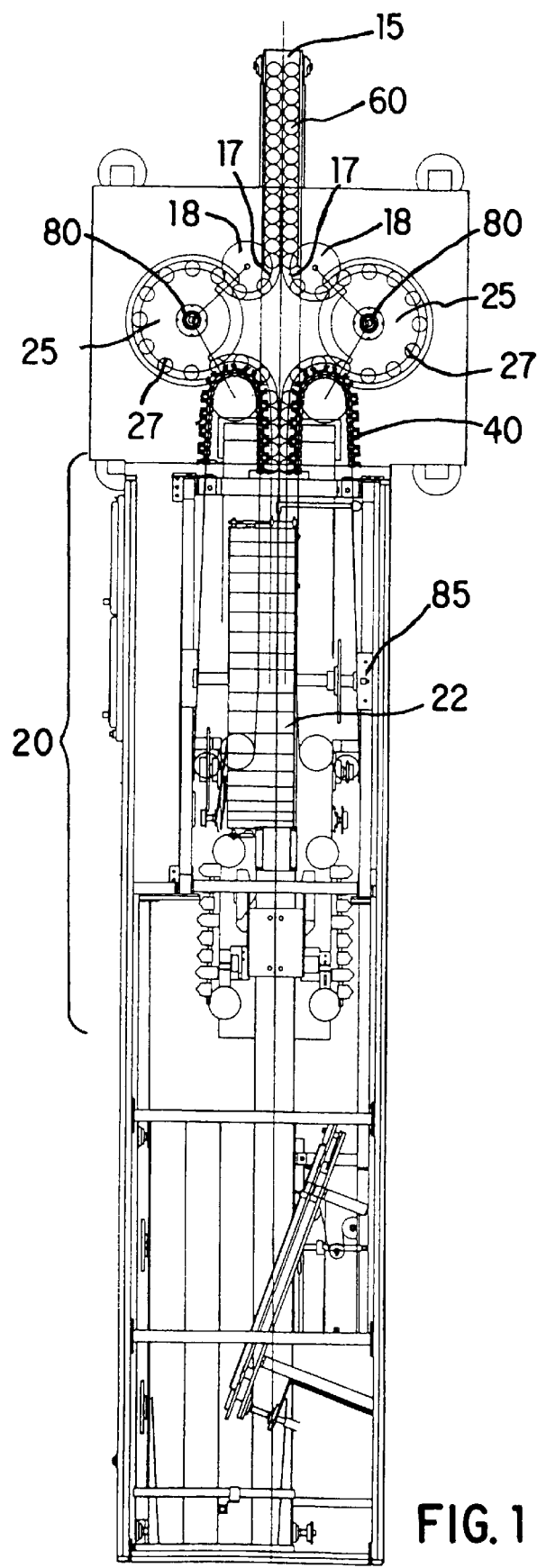
FIG. 1 is a top view of a system for packaging containers according to one preferred embodiment of this invention.

FIGS. 1–5 show a system for use with a packaging machine for orienting containers in a container carrier. The system is preferably used in connection with traditional packaging machines for applying container carrier 55 to a plurality of containers 60. Container carriers 55 may be, though not necessarily, formed from an elastic thermoplastic material having a plurality of container receiving openings, each for engaging a container 60. Alternatively, other packaging known to those having ordinary skill in the art, such as paperboard and shrinkwrap may be used in connection with the system.

In one example of such traditional packaging machines, inlet conveyor 15 feeds the plurality of containers 60 into packaging machine 20 having a plurality of jaws 22. The plurality of jaws 22 preferably spread the container carrier 55 and engage each container 60 with the container receiving opening. When the jaws 22 are removed, the container carrier tightly engages a plurality of containers, and absent a system for orienting containers, each container is rotationally positioned in a generally random orientation. In alternative examples of such traditional packaging machines, inlet conveyor 15 feeds the plurality of containers 60 into paperboard carriers that are glued or otherwise sealed or into plastic sleeves that are shrunk wrapped or otherwise sealed.

The system according to one preferred embodiment of this invention preferably cooperates with inlet conveyor 15 and packaging machine 20. Inlet 17 of the system preferably accepts a plurality of containers 60 from inlet conveyor 15. Inlet 17 may comprise inlet wheel 18 for transfer and possible singularization of containers 60 from inlet conveyor 15 to orientation wheel 25. According to one preferred embodiment of this invention, inlet conveyor 15 provides two single file rows of containers 60 to inlet 17 of the system.

The system according to one preferred embodiment of this invention is preferably connected between a conventional inlet conveyor 15 and packaging machine 20. According to one preferred embodiment of this invention, the system comprises a small footprint to enable retrofitting of existing equipment.

The plurality of containers 60 from inlet conveyor 15 are preferably fed into inlet 17 of orientation wheel 25. Inlet 17 may comprise inlet wheel 18 to space and singularize containers 60 prior to receipt by orientation wheel 25. Orientation wheel 25 is positioned to rotate each container 60 into a proper orientation and at the same time move each container 60 from inlet 17 of system toward packaging machine 20. Preferably, orientation wheel 25 is generally round with a plurality of radially spaced recesses 27 formed within a perimeter, each recess 27 configured to accept one container 60 of the plurality of containers 60. Therefore, orientation wheel 25 preferably initiates or maintains singularization of the plurality of containers 60 into separate recesses 27. Orientation wheel 25 is not necessarily generally round and is susceptible to any other embodiment that permits singularization of containers 60.

Figure 5:
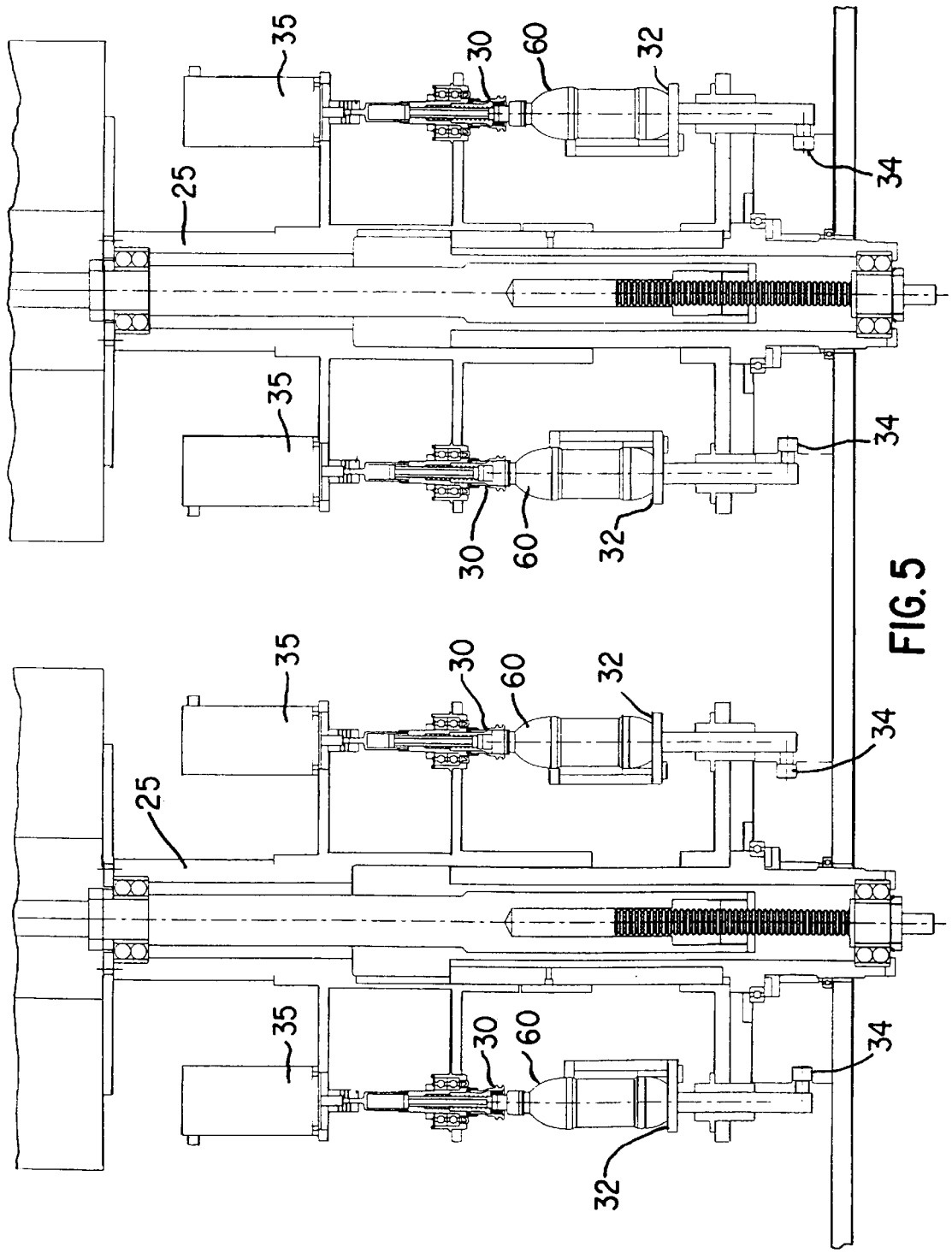
FIG. 5 is a cross-sectional side view of the system for orienting containers shown in FIG. 4.
Figure 6:
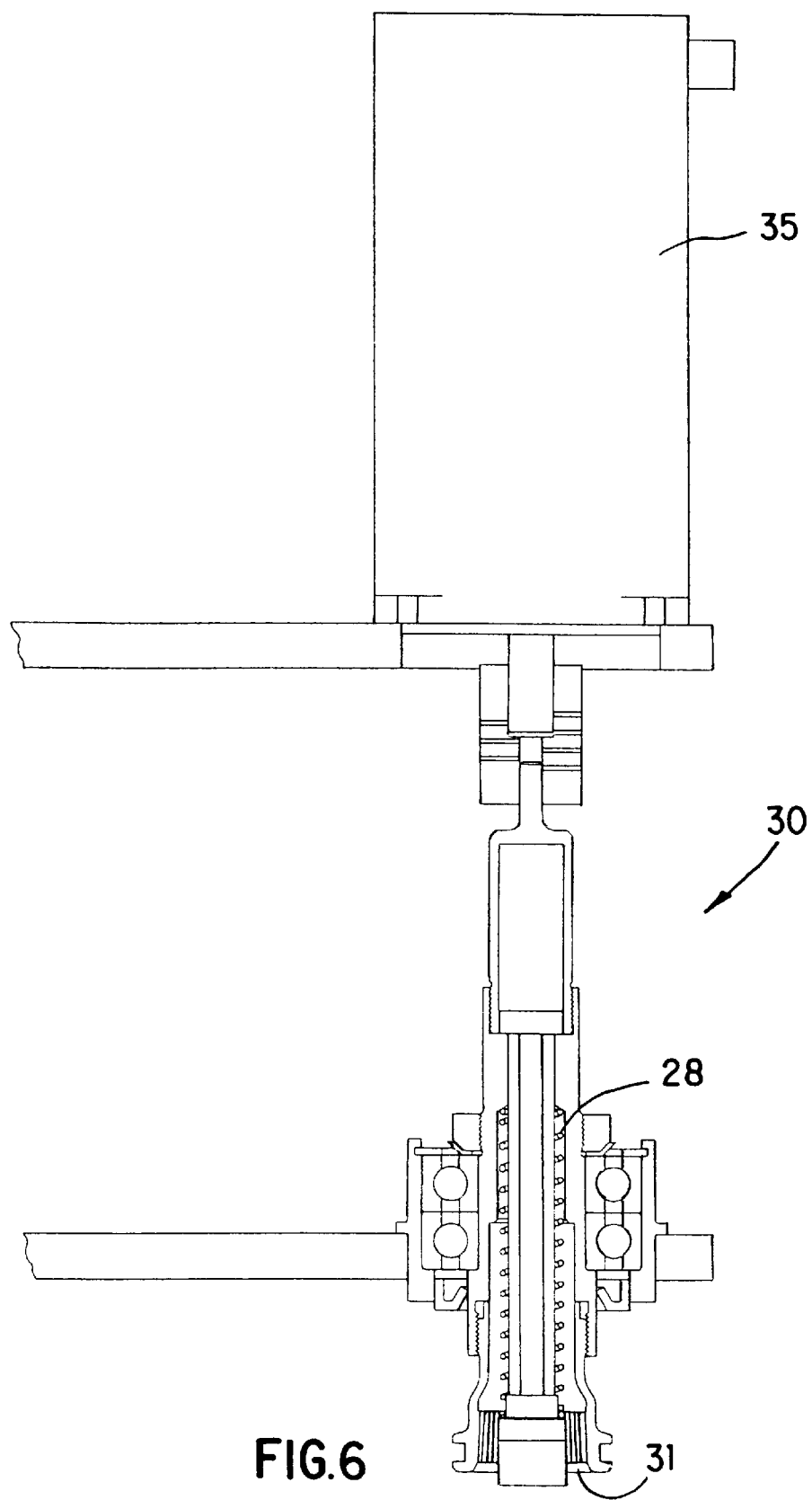
FIG. 6 is a cross-sectional side view of a chuck according to one preferred embodiment of this invention.

According to one preferred embodiment of this invention, one or more recesses 27 of orientation wheel 25 further includes chuck 30 for engaging one end of container 60. As best shown in FIGS. 5 and 6, chuck 30 preferably comprises sleeve 31 having an internal cavity formed to engage an end of container 60 in flush and/or mating contact. Flush, and preferably mating, contact is formed between chuck 30 and container 60 so that container 60 rotates in synchronization with chuck 30. In one preferred embodiment of this invention, the internal cavity of chuck 30 receives a bottle cap in mating engagement between ridges on the bottle cap and corresponding grooves in the internal cavity.

According to one preferred embodiment of this invention. each recess 27 further includes pressure plate 32 securing an opposite end of container 60 from chuck 30. Therefore, pressure plate 32 may engage a bottom of bottle, as shown in FIG. 5.

According to one preferred embodiment of this invention, cam 34 is operatively connected with respect to pressure plate 32 and moves pressure plate 32 toward chuck 30. Preferably, as orientation wheel 25 rotates, pressure plate 32 is lifted into engagement toward chuck 30. Pressure plate 32 may be slideably connected with respect to chuck 30. Chuck 30 may further include spring 28 to bias container 60 into position between sleeve 31 and pressure plate 32.

Figure 7:
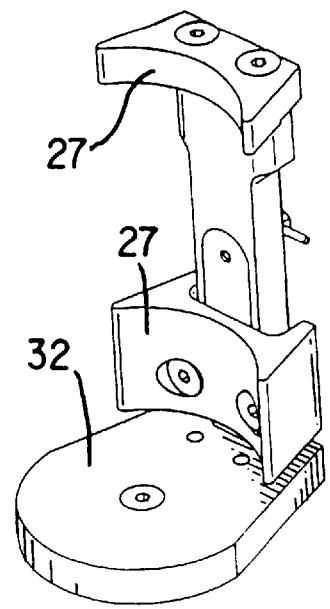
FIG. 7 is a perspective side view of a pressure plate according to one preferred embodiment of this invention.

As a result, container 60, such as a bottle, is firmly engaged between chuck 30 and pressure plate 32. As shown in FIG. 7, pressure plate 32, preferably, though not necessarily, comprises a generally flat, smooth surface that permits rotation of a bottom of container 60.

Motor 35 is preferably mechanically coupled to chuck 30 to rotate container 60. According to one preferred embodiment of this invention, when chuck 30 engages container 60, motor 35 rotates chuck 30 and thus rotates container 60.

Figure 4:
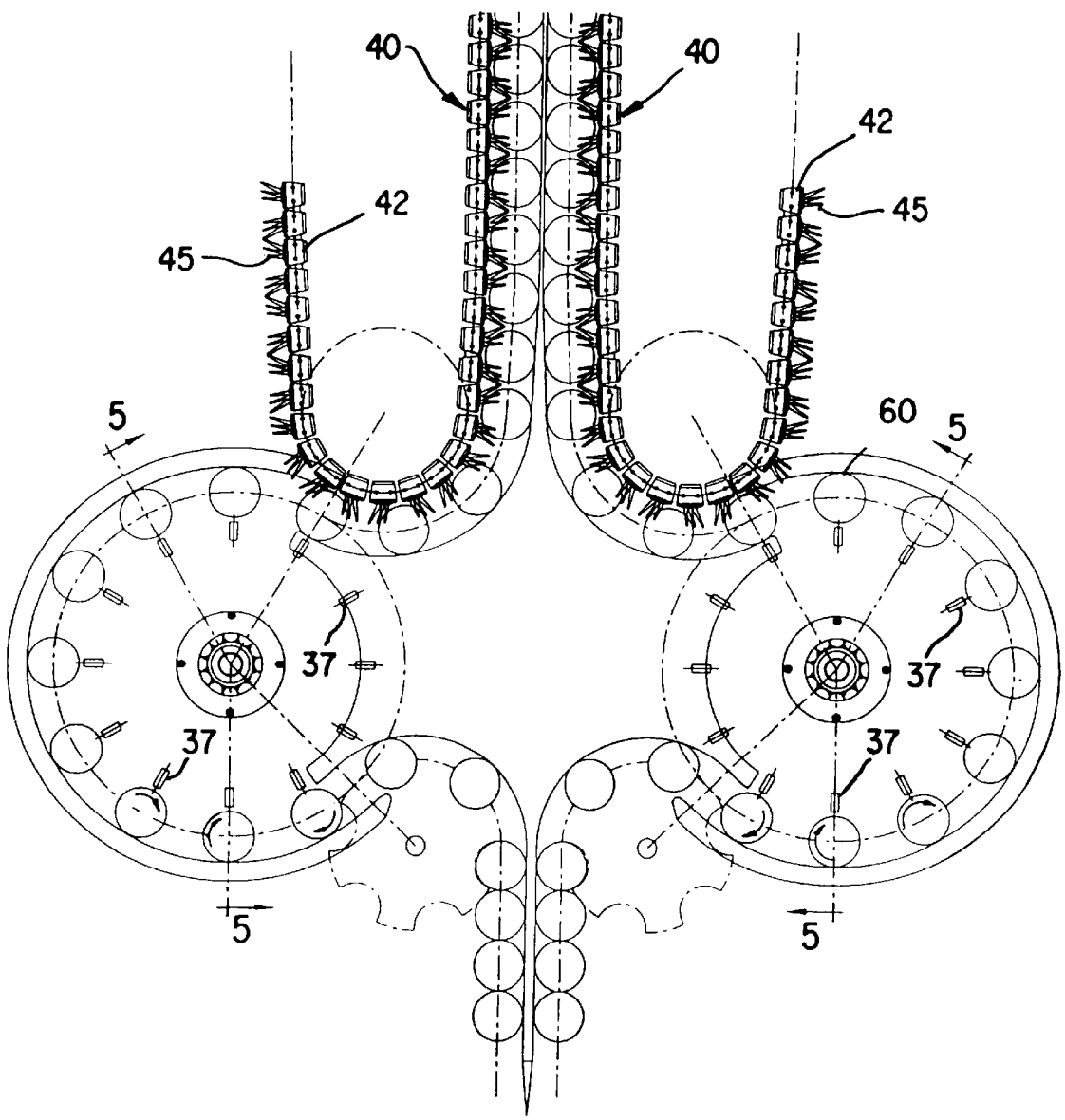
FIG. 4 is a diagrammatic top view of a system for orienting containers according to one preferred embodiment of this invention.

As shown in FIG. 4, at least one sensor 37 is additionally connected with respect to orientation wheel 25 for locating the oriented position of container 60 and stopping the rotation of container 60. Sensor 37 in one preferred embodiment of this invention sends an electronic signal to motor 35 thereby stopping the rotation of container 60 in an oriented position.

Figure 9:
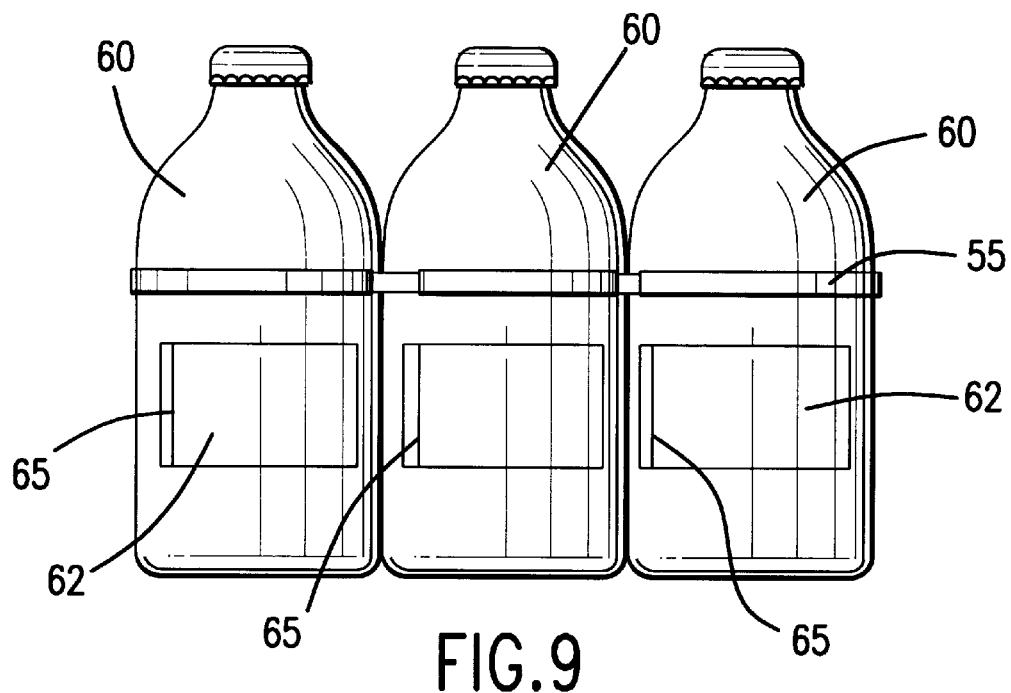
FIG. 9 is a side view of a package of oriented containers according to one preferred embodiment of this invention.
Figure 10:
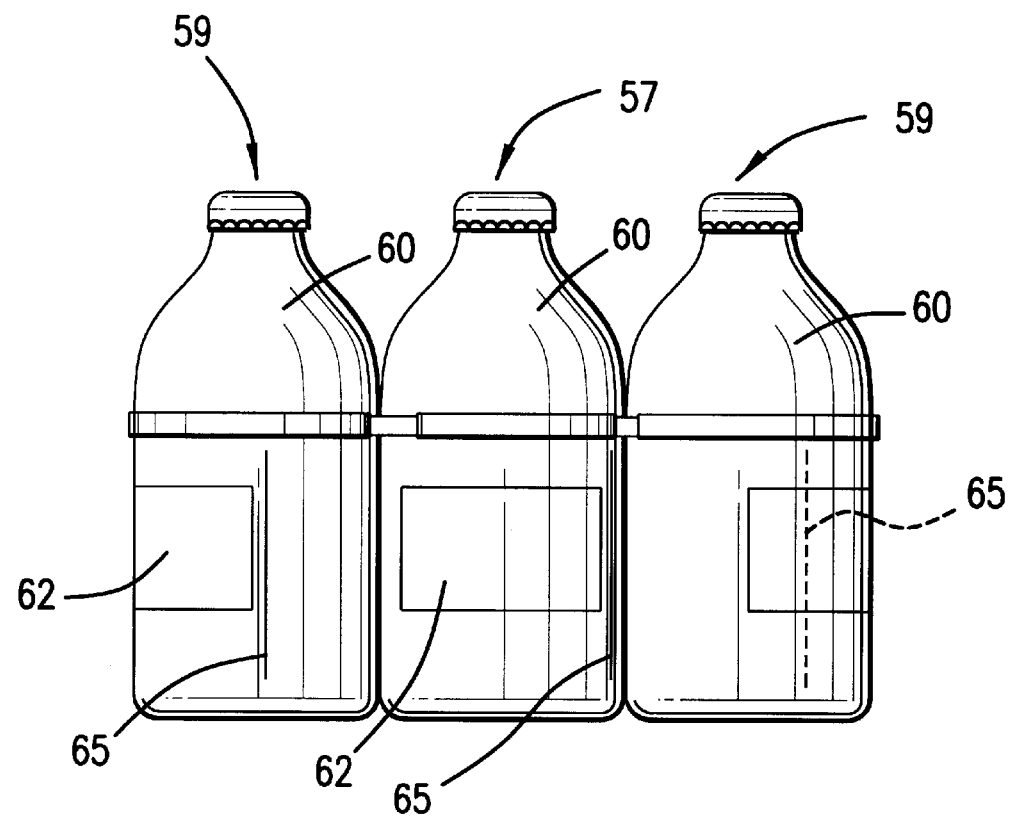
FIG. 10 is a side view of a package of oriented containers according to another preferred embodiment of this invention.

To optimize performance of sensor 37, each container preferably. through not necessarily, further comprises index mark 65 positioned on container 60, as shown in FIG. 10, or on or in container label 62, as shown in FIG. 9. According to one preferred embodiment of this invention, such index mark 65 comprises a visually undetectable mark, such as an ultra-violet index mark, positioned on the container 60. Alternatively, sensor 37 can read an existing graphic or physical characteristic of container 60, such as a design/graphic in container label 62 or a location of a seam in a sidewall of container 60 or a seam in container label 62.

Containers 60 are preferably substantially cylindrical and with vertical axes. Each container 60 may be separated into three 120° display panels positioned circumferentially around a sidewall of container 60. As such, depending upon the orientation of container 60, each container 60 can show a different display panel. Therefore, in a carrier having three containers 60 in a row, each of three different display panels may be positioned outwardly to comprise a single panoramic display. Depending upon the carrier configuration, container 60 may alternatively include two 180° display panels or any other appropriate group of display panels positioned circumferentially around a sidewall of container 60.

According to one preferred embodiment of this invention. sensor 37 comprises an ultra-violet photocell. The ultra-violet photocell preferably reads a corresponding ultra-violet index mark positioned on each container 60. An ultra violet index mark is preferably undetectable on each container 60 so as to not disturb the visual impact of container 60 and/or container label 62.

When sensor 37 identifies a correct rotational position of container 60, motor 35 preferably rotates container 60 a preferred and/or preprogrammed offset or alternatively stops rotation of container 60. As a result, motor 35 fixes the orientation of container 60 within the respective position in orientation wheel 25. Accordingly, orientation wheel 25 individually and independently places an oriented container 60 at a pickup location at a front end of packaging machine 20.

As shown in FIGS. 1–4, transfer belt 40 is preferably connected with respect to orientation wheel 25. Transfer belt 40 transfers an oriented container 60 in a fixed rotational position from orientation wheel 25 to packaging machine 20. Transfer belt 40 preferably grips oriented container 60 with sufficient force to prevent rotation as oriented container 60 slides along a stationary floor or against a stationary wall of the system.

As shown in the figures, a system according to this invention preferably comprises two orientation wheels 25 and two transfer belts 40 which together result in the orientation and transfer of two rows of containers 60. This arrangement speeds up the packaging process and also cooperates with typical packaging machines 20 that accept two rows of containers 60.

Figure 2:
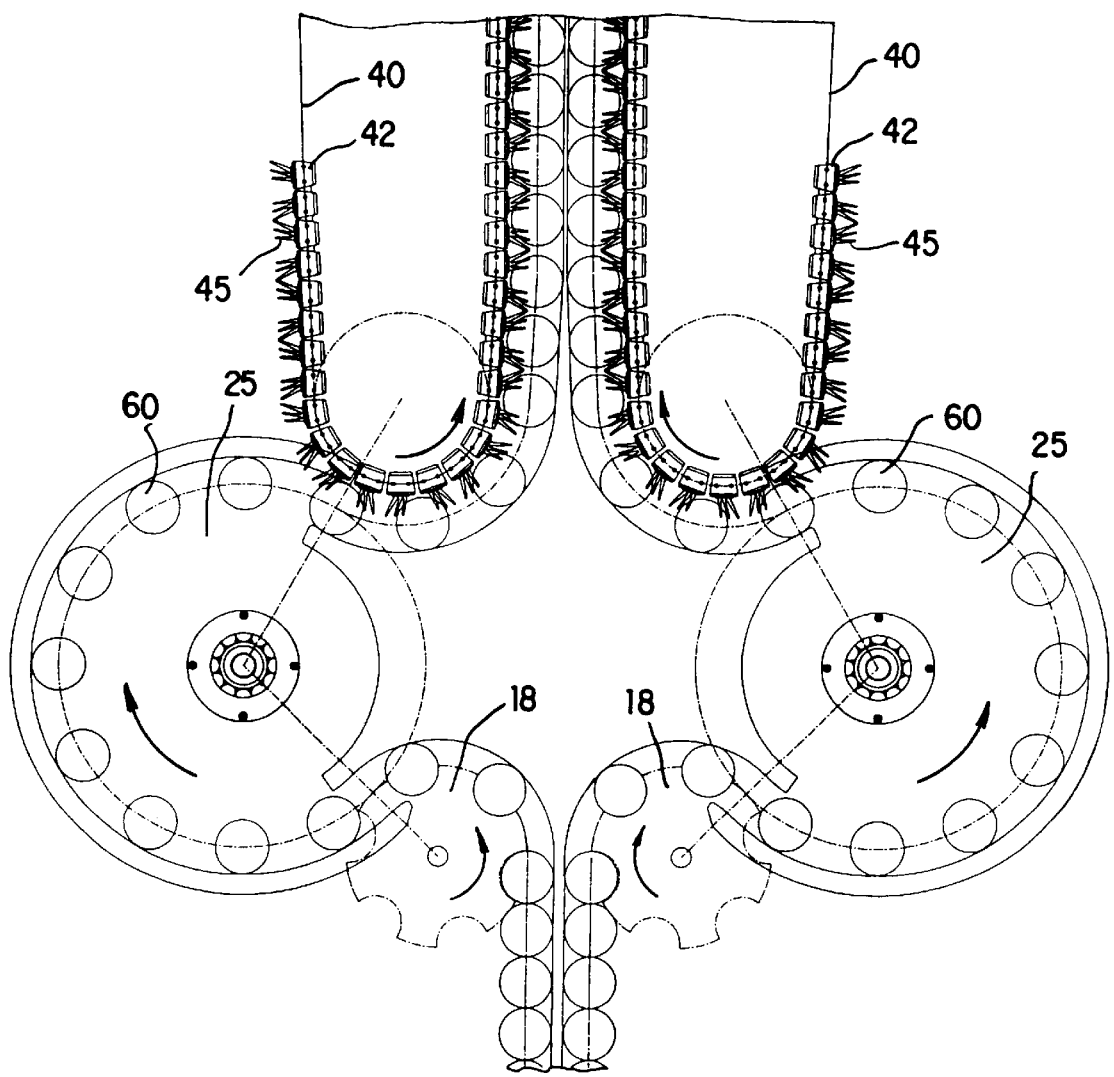
FIG. 2 is a top view of a system for orienting containers according to another preferred embodiment of this invention.
Figure 3:
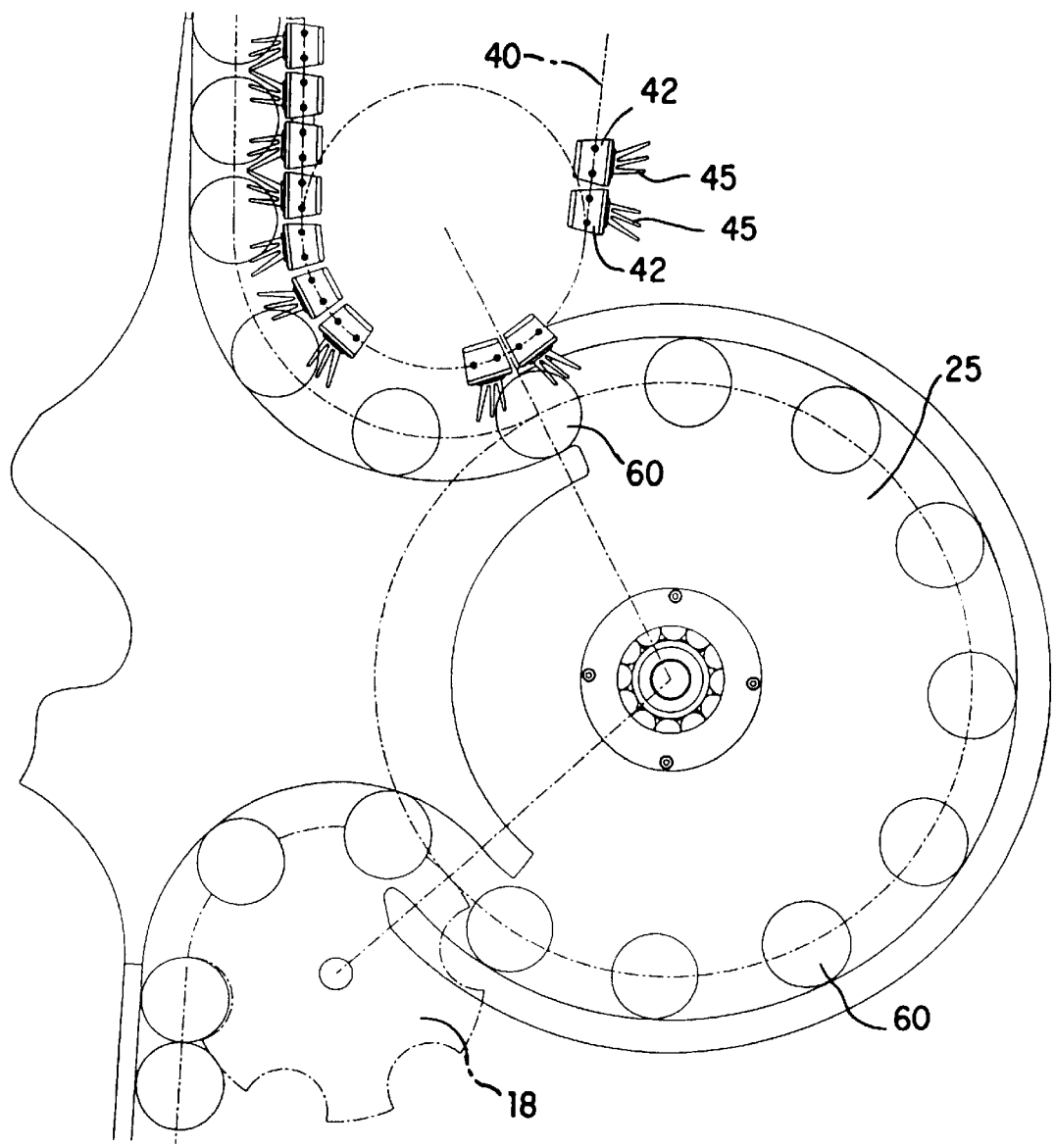
FIG. 3 is a diagrammatic top view of an orientation wheel and a transfer belt according to one preferred embodiment of this invention.
Figure 8:
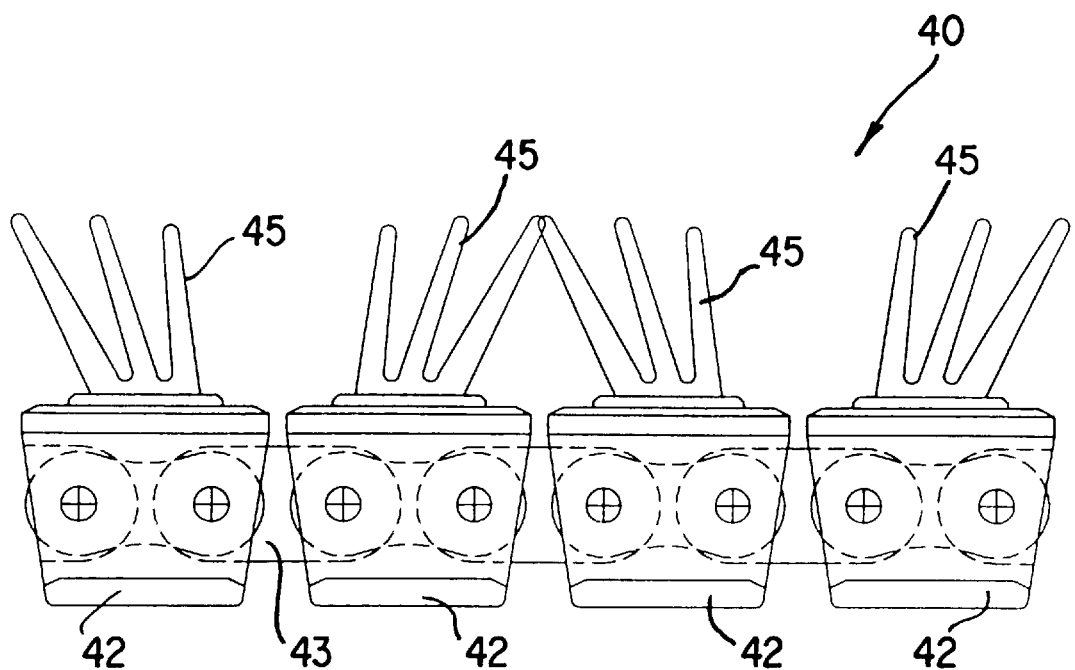
FIG. 8 is a top view of several links of a transfer belt according to one preferred embodiment of this invention.

As shown in FIGS. 2, 3 and 8, according to one preferred embodiment of this invention, transfer belt 40 comprises a plurality of fingers 45 spaced to receive oriented containers 60 from orientation wheel 25. The plurality of fingers 45 are preferably tactile so as to grip oriented containers 60 and prevent any rotation out of an oriented position. As shown in FIG. 8, transfer belt 40 may comprise a plurality of links 42 connected with respect to chain 43, similar to a drive chain, each link 42 containing one or more fingers 45.

According to one preferred embodiment of this invention, the plurality of fingers 45 are aligned in two groups of two or more fingers 45, each two groups for engaging one oriented container 60. Such an arrangement results in oriented container 60 nestled snugly between the two groups of fingers 45 and resists rotation of each oriented container 60 and contact with each adjacent oriented container 60. Transfer belt 40 as shown in FIGS. 2 and 3 comprises a preferred alignment of fingers 45 positioned so that each pair of adjacent links 42 contains two groups of divergent fingers 45 for accepting a single container 60.

According to one preferred embodiment of this invention, when transfer belt 40, and specifically chain 43, rotates around a sprocket, the adjacent two groups of fingers 45 are more separated than when transfer belt 40 is in a linear path. Therefore, when container 60 is loaded into transfer belt 40, the adjacent two groups of fingers 45 are spread to receive the container 60 and when transfer belt 40 maintains a linear course, the adjacent two groups of fingers 45 compact to tightly grip container 60 even as container 60 slides along stationary floor and sides of the system according to this invention and/or packaging machine 20.

Transfer belt 40 preferably feeds oriented container 60 from orientation wheel 25 directly into packaging machine 20. Alternatively, a similar, associated belt operatively connected to transfer belt 40 maintains the orientation of containers 60 as such containers are fed into packaging machine 20. Packaging machine 20 may include the plurality of jaws 22 positioned to apply container carrier 55 over two or more oriented containers 60.

According to one preferred embodiment of this invention, the system for orienting containers further includes an electronic timing system used to electronically synchronize cycles of orientation wheel 25 with packaging machine 20. Such electronic synchronization eliminates the requirement to mechanically couple and synchronize orientation wheel 25 with packaging machine 20. The electronic timing system preferably comprises proximity switch 80 and encoding switch 85 in communication between orientation wheel 25 and packaging machine 20. Encoding switch 85 is preferably positioned on a rotating shaft, such as the rotating shaft shown in FIG. 1, of packaging machine 20 and communicates with proximity switch 80 on orientation wheel 25 for synchronizing cycles between orientation wheel 25 and packaging machine 20.

A resulting package is shown in FIG. 9 wherein each container 60 is oriented in the same manner creating a package of containers 60 having a uniform appearance. FIG. 10 shows an additional embodiment of the resulting package wherein containers 60 are oriented depending on the relative position of container 60 within the package.

According to one preferred embodiment of this invention, sensor 37 or other device within system calculates which containers 60 are to be positioned in corners 59 of container carrier 55 and which containers 60 are to be positioned in center 57 of container carrier 55. Based upon the intended position of each respective container 60 within container carrier 55, orientation wheel 25 and associated sensor or sensors 37 orient containers 60 in corner 59 of container carrier 55 in a different orientation from containers 60 in center 57 of container carrier 55. This is preferable because containers 60 in comer 59 of container carrier 55 may have a visual exposure of 270° or more and containers 60 in center 57 of container carrier 55 have much less of a visual exposure. It may therefore result in a more aesthetically pleasing package if containers 60 in corners 59 of container carrier 55 are rotationally oriented so that the respective labels or graphics are centered at precise comers 59 of the package, as shown in FIG. 10.

Figure 11:
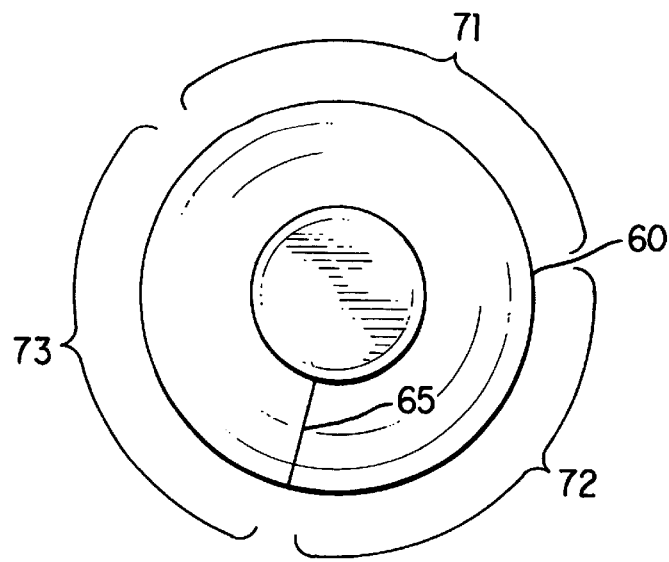
FIG. 11 is a top view of a container having three display panels according to one preferred embodiment of this invention.
Figure 12:
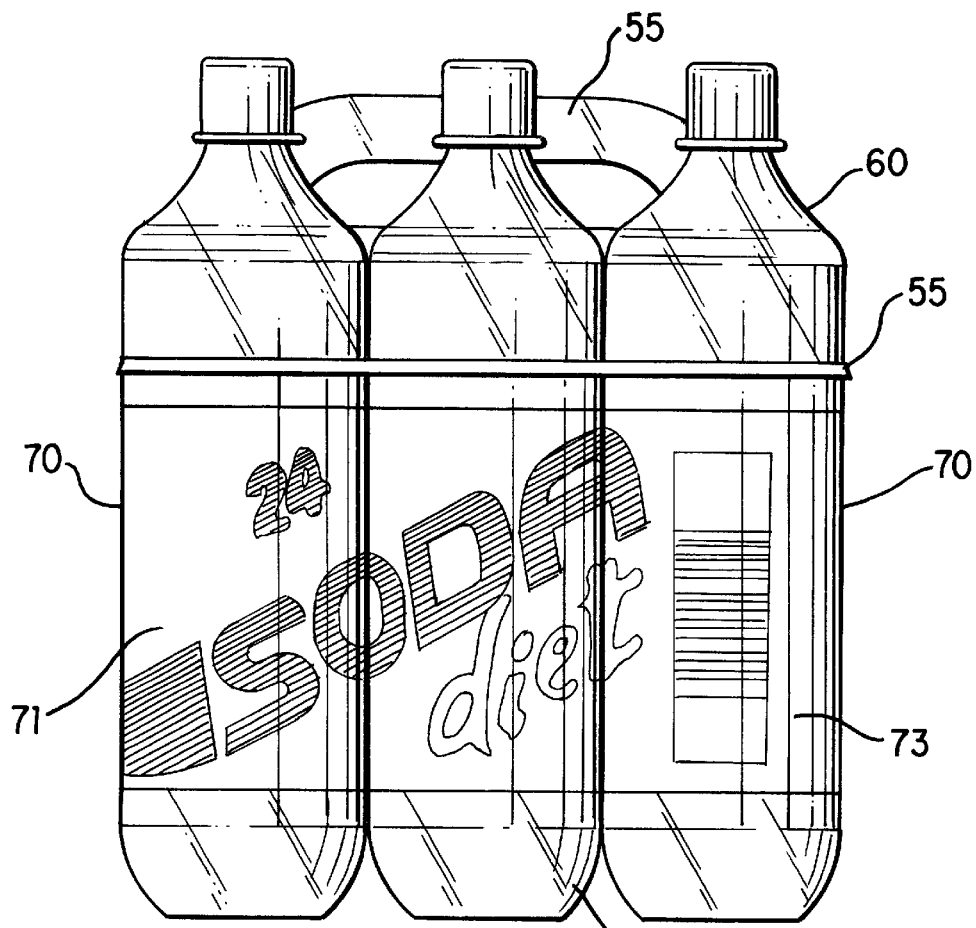
FIG. 12 is a side view of a package of oriented containers according to one preferred embodiment of this invention.

According to one preferred embodiment of this invention, a package having a plurality of containers 60 with each container 60 having two or more viewing panels 70, such as three viewing panels 71, 72, 73 shown in FIG. 11, wherein container carrier 55 is positioned along one plane and containers 60 are oriented so that a different viewing panel 71, 72, 73 for each container 60 is visible on one side of the package, as shown in FIG. 12.

A method of packaging a plurality of containers 60 in a container carrier 55 according to this preferred embodiment comprises feeding a plurality of containers 60 into orientation wheel 25. Each container 60 preferably includes two or more display panels 70 positioned circumferentially around a sidewall of each container 60. Orientation wheel 25 preferably fixes a first rotational position of a first container of the plurality of containers into a first oriented position displaying a first display panel 71. Orientation wheel 25 then preferably fixes a second rotational position of a second container of the plurality of containers adjacent the first container into a second oriented position displaying a second display panel 72. Depending upon the desired configuration, two or more containers 60 may be oriented in consecutive alignment. In a preferred embodiment of this invention for use in connection with a six-pack container carrier 55, a third oriented position 73 of a third container adjacent the second container may also be fixed by orientation wheel 25.

Figure 13:
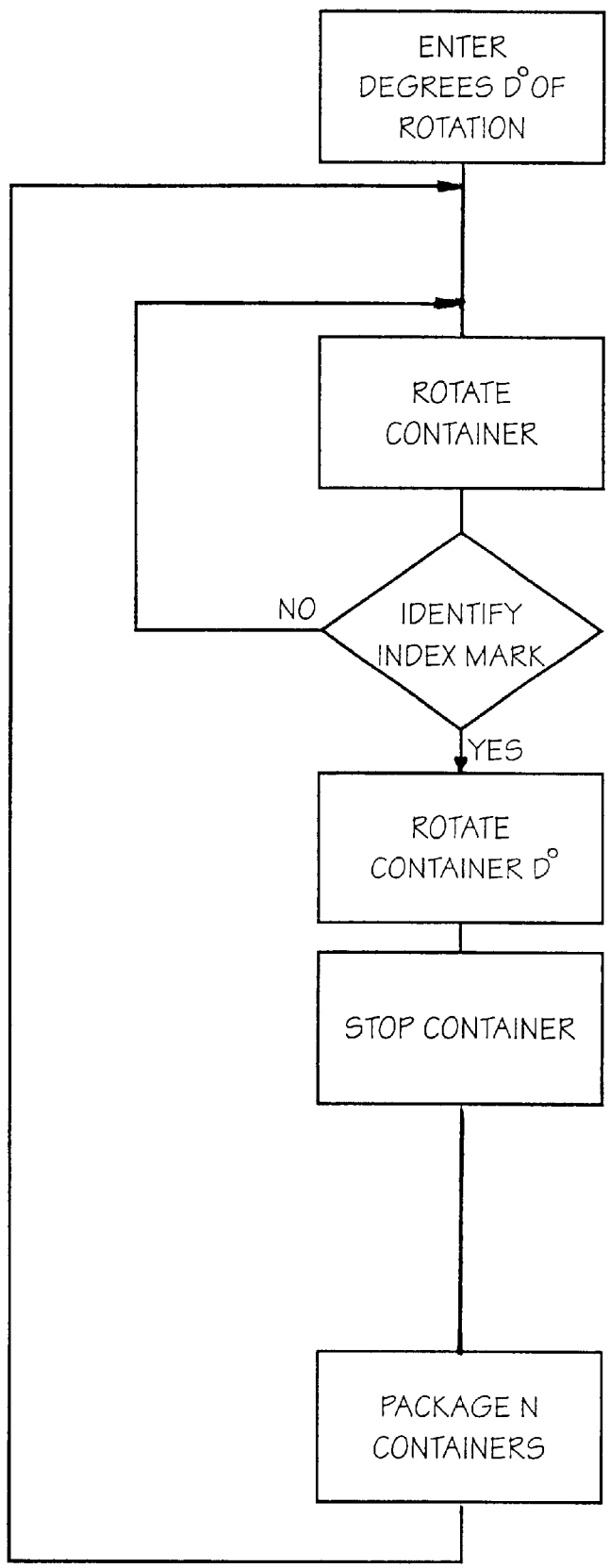
FIG. 13 is a flow chart describing a method for packaging oriented containers according he package shown in FIG. 9.

According to one preferred embodiment of this invention, orientation wheel 25 comprises twelve chucks 30, each chuck having motor 35 and sensor 37. Each motor 35 and sensor 37 is preferably independently programmable to set a preferred offset angle of rotation once index mark 65 is read by sensor 37. Accordingly, each chuck 30 can be adjusted to a desired offset resulting in twelve independent chuck adjustments for adjusting offsets in packages containing four, six, eight, twelve and twenty-four oriented containers 60. According to one preferred embodiment of this invention, each chuck 30 is programmed with the same offset resulting in each container 60 in a row having the same orientation within container carrier 55. FIG. 13 shows a flow chart for orienting containers 60 having a predetermined rotational offset according to one preferred embodiment of this invention.

According to another preferred embodiment of this invention, each chuck 30 is adjusted to have a different offset so that containers 60 within container carrier 55 have at least two different orientations within a row of oriented containers 60. The configuration of this invention having twelve chucks 30 is thus capable of orienting containers 60 in sets of one, two, three, four, six and twelve.

According to one preferred embodiment of this invention, an output screen associated with the system displays a numerical representation of each of the twelve chucks 30 in order (i.e., 01–12), together with a numerical representation of the rotational offset and a counter indicating an error code. The error code preferably counts the number of containers that are improperly oriented in a given production period. In one preferred embodiment of this invention, chuck 30 rotates each container 60 a predetermined number of rotations, such as one and one-half turns, seeking index mark 65. If no index mark 65 is identified within the predetermined number of rotations, an error code is entered in association with the respective chuck 30. Therefore, if the error code indicates a high number of improperly oriented containers 60, an operator may check to confirm that sensor 37 is clean and/or properly functioning or chuck 30 is rotating properly.

Figure 14:
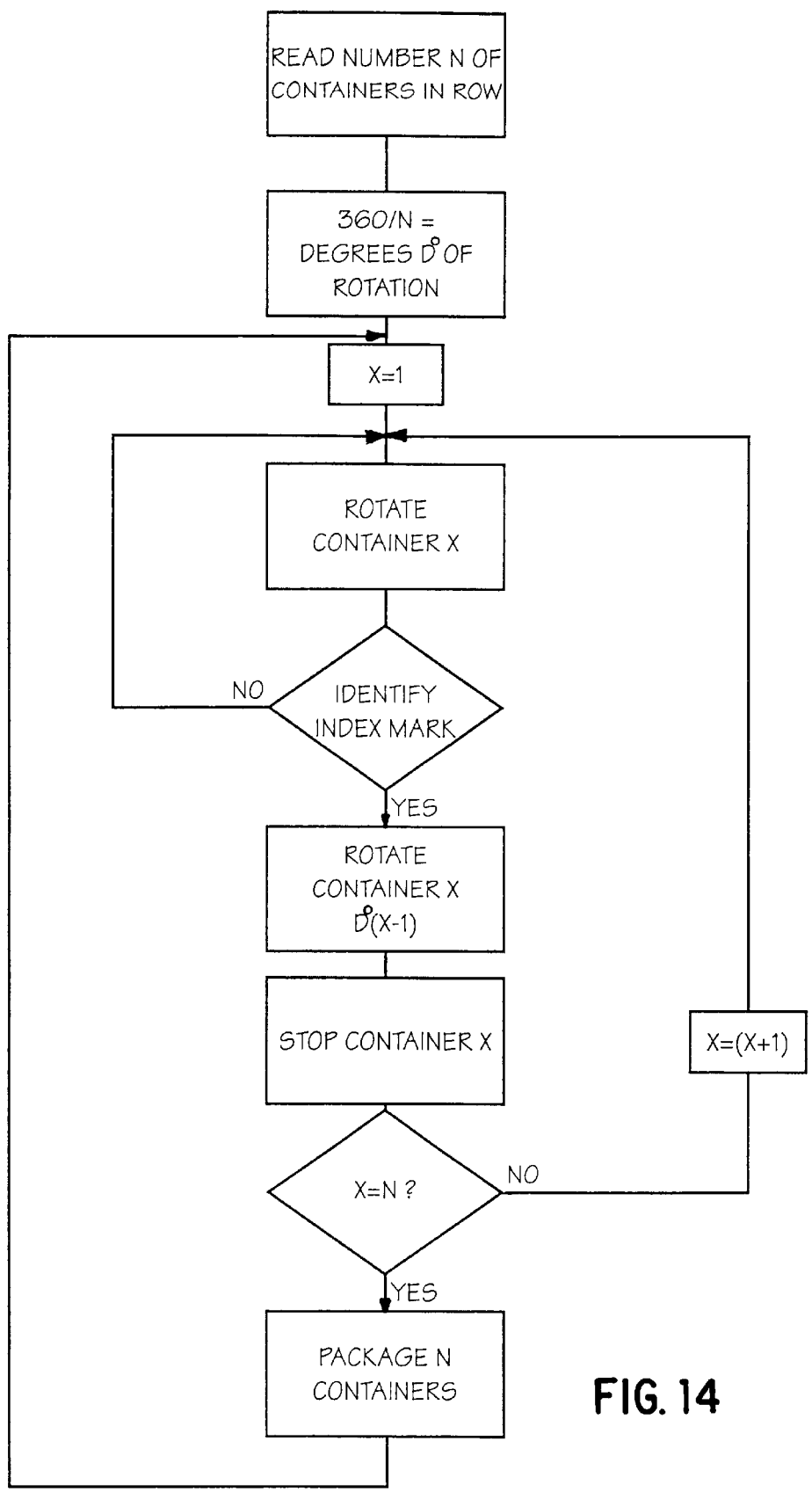
FIG. 14 is a flow chart describing a method for packaging oriented containers according to the package shown in FIG. 12.

Alternatively, chucks 30 may be programmed with continuous logic to accommodate rotation of a continuous flow of containers through orientation wheel 25. FIG. 14 shows a flow chart for orienting containers 60 having different viewing panels 71, 72, 73 according to one preferred embodiment of this invention.

Transfer belt 40 then preferably transfers the first container, the second container and the third container, each separately in a fixed rotational position, from orientation wheel 25 to packaging machine 20. Packaging machine 20 preferably applies container carrier 55 over the first container, the second container and the third container so that the first display panel, the second display panel and the third display panel together display a unitary display. FIG. 12 shows a package having three containers aligned with three display panels 71, 72, 73 facing outward from package. As described above, sensor 37 may detect index mark 65 positioned on container 60 to sense and fix the first, second and/or third rotational position of the container.

Finally, macros may be programmed to enable an operator to select a desired configuration or brand of containers 60 and the relative offsets are automatically programmed into each chuck 30. Therefore, if the operator selects "twenty-four pack" and "lemon-lime soda," the required offsets are entered into each chuck 30 so that the system is adjusted to orient containers of lemon-lime soda in a twenty-four pack configuration.

While in the foregoing specification this invention has been described in relation to certain preferred embodiments thereof, and many details have been set forth for purpose of illustration, it will be apparent to those skilled in the art that the system and method according to this invention are susceptible to additional embodiments and that certain of the details described herein can be varied considerably without departing from the basic principles of the invention.

We claim:

1. A system for use with a packaging machine for orienting containers in a container carrier, the system comprising:
   an inlet conveyor;
   an orientation wheel connected to the inlet conveyor to receive a plurality of unoriented containers, the orientation wheel adapted to rotate each unoriented container into a proper orientation resulting in a plurality of oriented containers;
   a transfer belt connected with respect to the orientation wheel, the transfer belt having a flexible tactile member contacting a sidewall of the oriented container to maintain rotational orientation of the oriented container and transfer each oriented container in a fixed rotational position from the orientation wheel to the packaging machine; and
   a mechanism positioned within the packaging machine for applying the container carrier over two or more oriented containers.

2. The system of claim 1 wherein the orientation wheel comprises:
   a chuck engaging one end of the unoriented container;
   a pressure plate securing an opposite end of the unoriented container;
   a motor mechanically coupled to the chuck to rotate the unoriented container; and
   a sensor connected with respect to the orientation wheel for locating the oriented position of the unoriented container and stopping the rotation of the motor.

3. The system of claim 2 wherein the motor repositions the unoriented container into a fixed position at a predetermined angle of rotation of the container based upon a desired orientation of the unoriented container.

4. The system of claim 3 wherein the predetermined angle varies by containers in a set of oriented containers within a package.

5. The system of claim 4 wherein the set repeats based upon a number of containers in the container carrier.

6. The system of claim 2 further comprising a cam operatively connected with respect to the pressure plate for moving the pressure plate with respect to the chuck.

7. The system of claim 2 wherein the chuck comprises a sleeve having an internal cavity formed to receive a bottle cap.

8. The system of claim 2 wherein the sensor comprises an ultraviolet photocell.

9. The system of claim 2 wherein each container further comprises an index mark that is detected by the sensor.

10. The system of claim 1 wherein the flexible tactile member comprises a plurality of fingers spaced to receive the oriented containers.

11. A system for use with a packaging machine for orienting containers in a container carrier, the system comprising:

an inlet conveyor;

an orientation wheel connected with respect to the inlet conveyor to receive a plurality of unoriented containers, the orientation wheel for rotating the unoriented containers into a proper orientation;

a transfer belt connected with respect to the orientation wheel, the transfer belt for transferring an oriented container in a fixed rotational position from the orientation wheel to the packaging machine, the transfer belt having a plurality of tactile fingers spaced to receive the oriented containers, wherein the plurality of fingers are aligned in two groups of two or more fingers, each two groups for engaging one oriented container; and a mechanism positioned within the packaging machine for applying the container carrier over two or more oriented containers.

12. The system of claim 11 wherein two adjacent groups of two or more fingers are spaced further apart during engagement with the one oriented container than after engagement with the one oriented container.

13. A system for use with a packaging machine for orienting containers in a container carrier, the system comprising:

an inlet conveyor;

an orientation wheel connected to the inlet conveyor to receive a plurality of unoriented containers, the orientation wheel adapted to rotate each unoriented container into a proper orientation resulting in a plurality of oriented containers;

a transfer belt connected to the orientation wheel, the transfer belt having a contacting surface moving at a same approximate speed as the orientation wheel and adapted to contact and grip a sidewall of the oriented container with sufficient force so as to maintain rotational orientation of the oriented container and transfer each oriented container in a fixed rotational position from the orientation wheel to the packaging machine; and a mechanism positioned within the packaging machine for applying the container carrier over two or more oriented containers.

14. The system of claim 13 wherein the contacting surface comprises a tactile member.

* * * * *